United States Patent
Qiao et al.

(10) Patent No.: US 12,472,903 B2
(45) Date of Patent: Nov. 18, 2025

(54) VEHICLE CONTROL METHOD, ON-BOARD TERMINAL AND STORAGE MEDIUM

(71) Applicant: Beijing Xiaomi Mobile Software Co., Ltd., Beijing (CN)

(72) Inventors: Guangjun Qiao, Beijing (CN); Lei Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 118 days.

(21) Appl. No.: 18/447,650

(22) Filed: Aug. 10, 2023

(65) Prior Publication Data
US 2024/0051499 A1 Feb. 15, 2024

(30) Foreign Application Priority Data
Aug. 10, 2022 (CN) .......................... 202210956704.0

(51) Int. Cl.
B60R 25/24 (2013.01)
B60R 25/01 (2013.01)
G07C 9/00 (2020.01)
H04B 17/318 (2015.01)

(52) U.S. Cl.
CPC ............ *B60R 25/245* (2013.01); *B60R 25/01* (2013.01); *G07C 9/00309* (2013.01); *H04B 17/318* (2015.01); *B60R 2325/101* (2013.01); *B60R 2325/205* (2013.01); *G07C 2009/00793* (2013.01); *G07C 2209/08* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 9,483,887 B1 | 11/2016 | Soleimani | |
| 2018/0025500 A1* | 1/2018 | Nielsen | G06V 20/52 |
| | | | 382/103 |
| 2019/0256049 A1 | 8/2019 | Jawany et al. | |
| 2021/0168563 A1 | 6/2021 | Sanji et al. | |
| 2022/0060974 A1* | 2/2022 | Zeng | H04W 48/20 |
| 2024/0051499 A1* | 2/2024 | Qiao | H04B 17/318 |

FOREIGN PATENT DOCUMENTS

CN 110386105 A 10/2019

OTHER PUBLICATIONS

European Patent Office, Extended European Search Report Issued in Application No. 23190540.7, Dec. 15, 2023, Germany, 8 pages.

* cited by examiner

*Primary Examiner* — Carlos Garcia
(74) *Attorney, Agent, or Firm* — Volpe Koenig

(57) ABSTRACT

A vehicle control method includes: in response to obtaining a target received signal strength indication (RSSI) value of ranging broadcast information sent by a mobile terminal, obtaining a target mapping relationship matching a device model of the mobile terminal, where the target mapping relationship includes a mapping relationship between a RSSI value and a distance between the mobile terminal and a vehicle; based on the target mapping relationship, determining a target distance corresponding to the target RSSI value; and in response to determining that the target distance is less than or equal to a preset distance threshold, controlling the vehicle associated with the on-board terminal to unlock a door lock.

15 Claims, 5 Drawing Sheets

VEHICLE CONTROL METHOD, ON-BOARD TERMINAL AND STORAGE MEDIUM

CROSS REFERENCE TO RELATED APPLICATIONS

This application claims priority to Chinese Patent Application No. 202210956704.0 filed on Aug. 10, 2022, the entire contents of which is incorporated herein by reference.

TECHNICAL FIELD

The present disclosure relates to the field of internet-of-things technologies and in particular to a vehicle control method, an on-board terminal and a storage medium.

BACKGROUND

Along with the growing development of mobile terminals, such as smart phones, it has gradually become an important part for improving the experience of vehicle users to realize control of the functions, such as vehicle unlocking and the like, by setting a digital vehicle key in the mobile terminals. In the related arts, in order to achieve control of the vehicle unlocking function by using a mobile terminal, it is required to detect a distance between the mobile terminal and the vehicle. For example, a received signal strength indication (RSSI) value of a Bluetooth broadcast signal sent by the mobile terminal is detected, and then, based on a general mapping relationship between a RSSI value and a distance, the distance between the mobile terminal and the vehicle is determined. Thus, when it is determined that the distance is less than a preset threshold, the unlocking operation is achieved by sending an unlocking instruction to a lock control device of the vehicle.

However, different mobile terminals have different performances in antenna, housing material, transmission power, and the like. Therefore, there may be a detection error when the distance between the mobile terminal and the vehicle is detected by using the above general mapping relationship. Further, the accuracy of sensor-less control on the vehicle is affected, resulting in inconvenience for users.

SUMMARY

In order to overcome the problems in the related arts, embodiments of the present disclosure provide a vehicle control method, an on-board terminal and a storage medium, so as to solve the defects in the related arts.

According to a first aspect of embodiments of the present disclosure, there is provided a vehicle control method, which includes: in response to obtaining a target received signal strength indication (RSSI) value of ranging broadcast information sent by a mobile terminal, obtaining a target mapping relationship matching a device model of the mobile terminal, where the target mapping relationship includes a mapping relationship between a RSSI value and a distance between the mobile terminal and a vehicle; based on the target mapping relationship, determining a target distance corresponding to the target RSSI value; and in response to determining that the target distance is less than or equal to a preset distance threshold, controlling the vehicle associated with the on-board terminal to unlock a door lock.

In some embodiments, obtaining the target mapping relationship matching the device model of the mobile terminal includes: obtaining a pre-stored target mapping relationship from a server or the local memory of the on-board terminal.

In some embodiments, the method further includes: storing the target mapping relationship in advance in the local memory of the on-board terminal by: obtaining a reference RSSI value of the ranging broadcast information sent by the mobile terminal at a reference position, where the reference position is any one of at least one reference position, and a distance between each of the at least one reference position and the vehicle is known; based on the reference RSSI value and a distance between the reference position and the vehicle, correcting a currently-stored to-be-corrected mapping relationship to obtain a corrected mapping relationship; and determining the corrected mapping relationship as the target mapping relationship matching the device model of the mobile terminal and storing the target mapping relationship in the local memory of the on-board terminal.

In some embodiments, the at least one reference position includes a preset position around a door of the vehicle, and obtaining the reference RSSI value of the ranging broadcast information sent by the mobile terminal at the reference position includes: in response to detecting a touch operation for the door, obtaining the reference RSSI value of the ranging broadcast information currently sent by the mobile terminal.

In some embodiments, obtaining the reference RSSI value of the ranging broadcast information sent by the mobile terminal at the reference position includes: generating a prompt message for sending confirmation information at the reference position, where the confirmation information is configured to confirm that the mobile terminal is at the reference position; and in response to receiving the confirmation information, obtaining the reference RSSI value of the ranging broadcast information currently sent by the mobile terminal.

In some embodiments, based on the reference RSSI value and the corresponding distance between the reference position and the vehicle, correcting a currently-stored to-be-corrected mapping relationship to obtain a corrected mapping relationship includes: a distance corresponding to a RSSI value corresponding to the reference RSSI value in the currently-stored to-be-corrected mapping relationship may be replaced with the corresponding distance corresponding to the reference RSSI value; and based on a known signal attenuation law or a preset interpolation algorithm, correcting distances corresponding to other RSSI values in the currently-stored to-be-corrected mapping relationship in a unified way.

In some embodiments, the method further includes: uploading the corrected mapping relationship as the target mapping relationship matching the device model of the mobile terminal to the server for storage.

In some embodiments, the method further includes: in response to controlling the vehicle associated with the on-board terminal to unlock the door lock, starting timing; in response to determining that a time interval between starting the timing and detecting a touch operation for a door corresponding to a driver seat of the vehicle is greater than or equal to a preset time threshold, adjusting the target mapping relationship to obtain an adjusted target mapping relationship; and based on the adjusted target mapping relationship, updating the pre-stored target mapping relationship.

According to a second aspect of embodiments of the present disclosure, there is provided an on-board terminal, which includes: a processor; and a memory configured to store computer programs; where the processor is configured to, when executing the computer programs, perform operations including: in response to obtaining a target received signal strength indication (RSSI) value of ranging broadcast information sent by a mobile terminal, obtain a target mapping relationship matching a device model of the mobile terminal, where the target mapping relationship includes a mapping relationship between a RSSI value and a distance; based on the target mapping relationship, determine a target distance corresponding to the target RSSI value; and in response to determining that the target distance is less than or equal to a preset distance threshold, control a vehicle associated with the on-board terminal to unlock a door lock.

According to a third aspect of embodiments of the present disclosure, there is provided a non-transitory computer readable storage medium, storing computer programs thereon, where the computer programs, when executed by a processor, cause the processor to perform operations including: in response to obtaining a target received signal strength indication (RSSI) value of ranging broadcast information sent by a mobile terminal, obtain a target mapping relationship matching a device model of the mobile terminal, where the target mapping relationship includes a mapping relationship between a RSSI value and a distance; based on the target mapping relationship, determine a target distance corresponding to the target RSSI value; and in response to determining that the target distance is less than or equal to a preset distance threshold, control a vehicle associated with an on-board terminal to unlock a door lock.

It is to be understood that the above general descriptions and subsequent detailed descriptions are only illustrative and explanatory, and shall not be intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
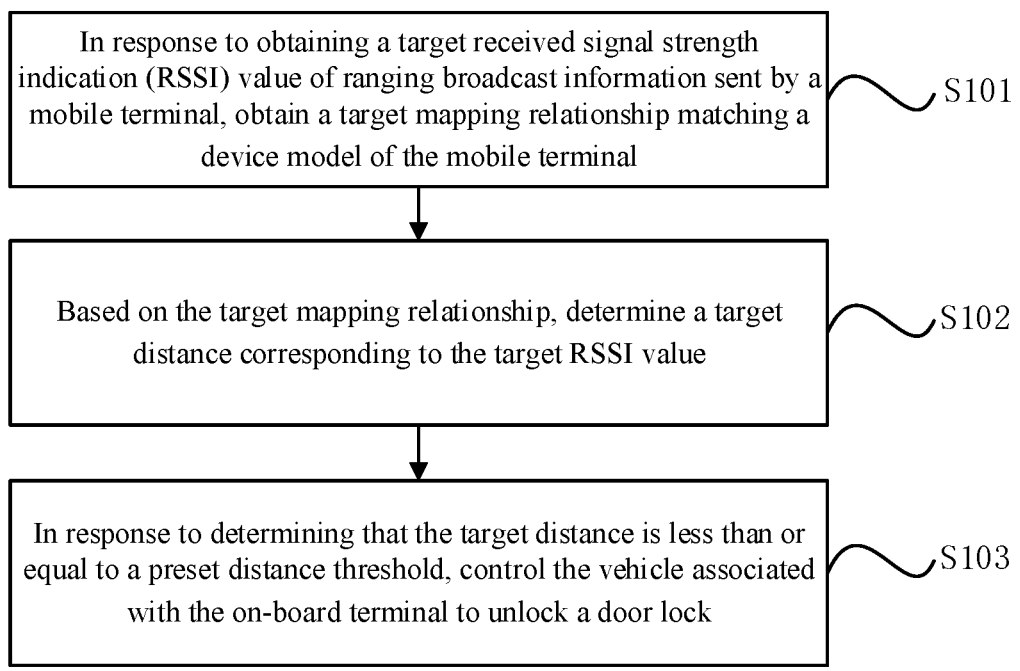
FIG. 1 is a flowchart illustrating a vehicle control method according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a vehicle control method according to an exemplary embodiment of the present disclosure. The method in this embodiment can be performed by an on-board terminal (the on-board terminal is a terminal associated with a vehicle to perform data processing). As shown in FIG. 1, the method includes the following steps S101 to S103.

At step S101, in response to obtaining a target received signal strength indication (RSSI) value of ranging broadcast information sent by a mobile terminal, a target mapping relationship matching a device model of the mobile terminal is obtained.

In this embodiment, the on-board terminal may, when obtaining the target RSSI value of the ranging broadcast information sent by the mobile terminal, obtain the target mapping relationship matching the device model of the mobile terminal. Where the target mapping relationship includes a mapping relationship between a RSSI value and a distance.

For example, a Bluetooth module (Bluetooth anchor point) in the vehicle may periodically send a Bluetooth broadcast. When the mobile terminal receives the Bluetooth broadcast and detects that the vehicle is within a communication range, the mobile terminal may originate a Bluetooth connection request to the Bluetooth module in the vehicle and thus establish a Bluetooth connection with the Bluetooth module in the vehicle. Based on this, the mobile terminal may interact with and establish a secure channel with the Bluetooth module in the vehicle so as to complete identity confirmation with the vehicle in the established secure channel. Further, when the identity confirmation is passed, the mobile terminal may send ranging broadcast information (the ranging broadcast information may be broadcast information sent periodically by the mobile terminal for the purpose of ranging in a case of establishing Bluetooth connection with the on-board terminal) based on the above Bluetooth connection. Further, the on-board terminal may receive the ranging broadcast information from the mobile terminal via the Bluetooth module in the vehicle, measure the target RSSI value of the ranging broadcast information, and obtain a target mapping relationship matching the device model of the mobile terminal. It can be understood that there may be at least one Bluetooth module in the vehicle, which is not limited to this embodiment.

In some embodiments, the on-board terminal may obtain a pre-stored target mapping relationship from a server, or obtain a pre-stored target mapping relationship from a local memory of the on-board terminal. The server may be a server, such as a local server or a cloud server, associated in advance with the on-board terminal and equipped with data processing functions. The server may be deployed in one electronic device or a device cluster formed by several electronic devices. The target mapping relationship pre-stored in the server may be a mapping relationship obtained and uploaded by the above on-board terminal or an on-board terminal of another vehicle.

Figure 2:
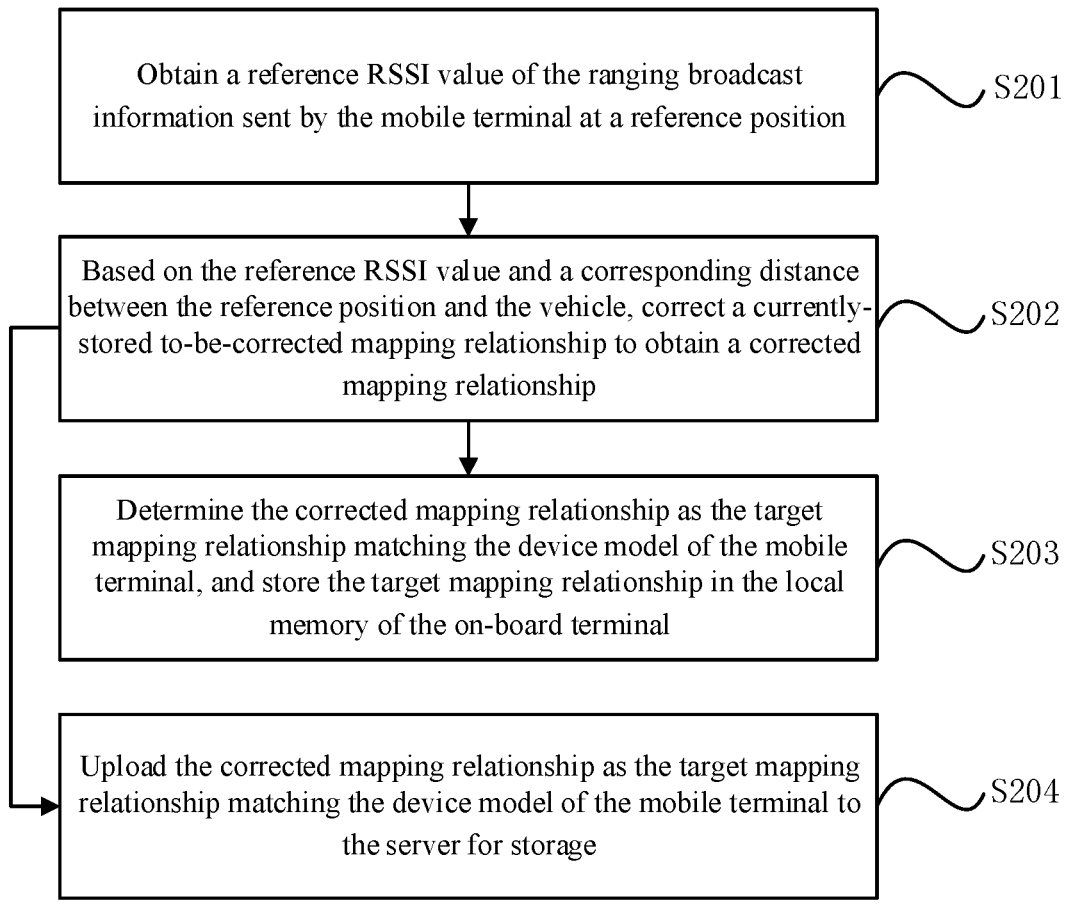
FIG. 2 is a flowchart illustrating steps of storing a target mapping relationship in a local memory of an on-board terminal according to an exemplary embodiment of the present disclosure.

In some other embodiments, the manner in which the on-board terminal stores the target mapping relationship can be referred to in the embodiment shown in FIG. 2 and not described herein.

At step S102, based on the target mapping relationship, a target distance corresponding to the target RSSI value is determined.

In this embodiment, when the target RSSI value and the target mapping relationship are obtained, the target distance corresponding to the target RSSI value may be determined based on the target mapping relationship.

Since the above target mapping relationship is a mapping relationship between a RSSI value and a distance, when the target RSSI value is determined, the target distance corresponding to the RSSI value may be queried based on the target mapping relationship. It can be understood that the target distance may be used to measure a distance between the mobile terminal and the vehicle.

At step S103, in response to determining that the target distance is less than or equal to a preset distance threshold, the vehicle associated with the on-board terminal is controlled to unlock a door lock.

In this embodiment, when the target distance corresponding to the target RSSI value is determined based on the target mapping relationship, the on-board terminal may compare the target distance with the preset distance threshold. When it is detected that the target distance is less than or equal to the preset distance threshold, the vehicle is controlled to unlock the door lock. Since the user does not need to actively perform the unlocking operation, sensor-less unlocking for the vehicle can be accomplished in this embodiment.

As described above, in the method of the embodiment, in response to obtaining a target RSSI value of the ranging broadcast information sent by the mobile terminal, a target mapping relationship matching the device model of the mobile terminal is obtained. Based on the target mapping relationship, a target distance corresponding to the target RSSI value is determined. In response to determining that the target distance is less than or equal to the preset distance threshold, the vehicle associated with the on-board terminal is controlled to unlock the door lock. Since the target distance is determined based on the target mapping relationship matching the device model of the mobile terminal, compared with the manner of determining the distance based on the general mapping relationship in the related arts, the ranging accuracy can be improved. Thus, the accuracy of performing sensor-less control on the vehicle based on the ranging result can be improved. Based on this method, the use experiences of the vehicle users can be improved.

FIG. 2 is a flowchart illustrating steps of storing the target mapping relationship in the local memory of the on-board terminal according to an exemplary embodiment of the present disclosure. This embodiment illustrates how to store the target mapping relationship in the local memory of the on-board terminal, based on the above embodiment. As shown in FIG. 2, the method of this embodiment may further include storing the target mapping relationship in the local memory of the on-board terminal, as described in steps S201 to S203.

At step S201, a reference RSSI value of the ranging broadcast information sent by the mobile terminal at a reference position is obtained.

In this embodiment, there may be at least one reference position. When it is detected that the mobile terminal is at any one of the at least one reference position, the reference RSSI value of the ranging broadcast information sent by the mobile terminal at the reference position may be obtained, where a distance between each of the at least one reference position and the vehicle is known.

For example, the at least one reference position may include a preset position around a door of the vehicle. When the on-board terminal detects a touch operation of a user for the door, the on-board terminal may determine that the mobile terminal is currently at the preset position around the door, and further obtain the reference RSSI value of the ranging broadcast information sent by the mobile terminal at this position. For example, the touch operation of the user for the door can include an operation of opening the door, holding a handle of the door, and/or the like For example, the operation of opening the door may include opening the door from inside the vehicle and/or outside the vehicle.

Illustratively, the preset position around the door may be 0.3 meters away from the door, namely, when the hand of the user touches the handle of the door (a sensor for detecting touch operation is disposed on the handle), it is determined that the mobile terminal carried by the user is 0.3 meters vertically from the door. Since the distance between the Bluetooth module in the vehicle and the door is known, a distance between the mobile terminal and the Bluetooth module in the vehicle (i.e., the distance between the reference position and the vehicle) can be calculated. It is to be noted that the value of 0.3 meters is only illustrative and can be adjusted based on application requirements in practical applications.

In some embodiments, the door may include a door corresponding to a driver seat, a door corresponding to a front passenger seat, doors corresponding to back passenger seats, a trunk door, and/or the like, which is not limited in this embodiment.

It can be understood that after the mobile terminal establishes Bluetooth connection with the Bluetooth module in the vehicle, the mobile terminal may, based on the Bluetooth connection, continuously send the ranging broadcast information in a set period. When the user carrying the mobile terminal triggers the touch operation for the door, the on-board terminal may obtain a corresponding reference RSSI value based on the ranging broadcast information currently sent by the mobile terminal.

Figure 3:
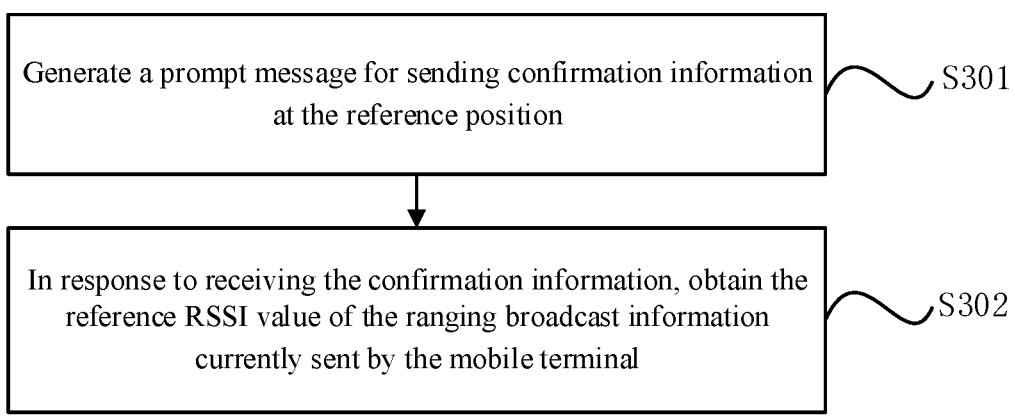
FIG. 3 is a flowchart illustrating steps of obtaining a reference RSSI value of the ranging broadcast information sent by the mobile terminal at a reference position according to an exemplary embodiment of the present disclosure.

In some other embodiments, the manner of obtaining the reference RSSI value of the ranging broadcast information sent by the mobile terminal at the reference position may be referred to in the embodiment shown in FIG. 3 and not described herein.

At step S202, based on the reference RSSI value and a corresponding distance between the reference position and the vehicle, a currently-stored to-be-corrected mapping relationship is corrected to obtain a corrected mapping relationship.

In this embodiment, after the reference RSSI value of the ranging broadcast information sent by the mobile terminal at any one of the at least one reference position is obtained, the currently-stored to-be-corrected mapping relationship may be corrected based on the reference RSSI value and the corresponding distance to obtain a corrected mapping relationship.

The above corresponding distance may be a known distance between the above reference position and the vehicle. These distances are measured in advance, for example, a distance between each door of the vehicle and the Bluetooth module is measured in advance.

In some embodiments, after the reference RSSI value of the ranging broadcast information sent by the mobile terminal at the reference position is obtained, a distance corresponding to a RSSI value corresponding to the reference RSSI value in the currently-stored to-be-corrected mapping relationship may be replaced with the corresponding distance corresponding to the reference RSSI value. And based on a known signal attenuation law or a preset interpolation algorithm, the distances corresponding to other RSSI values in the currently-stored to-be-corrected mapping relationship may be corrected in a unified way. Thus, correction to the currently-stored to-be-corrected mapping relationship can be achieved. It is to be noted that the above signal attenuation law or preset interpolation algorithm may be selected from the related arts based on actual requirements, which is not limited in this embodiment.

At step S203, the corrected mapping relationship is determined as the target mapping relationship matching the device model of the mobile terminal and stored in the local memory of the on-board terminal.

In this embodiment, after the currently-stored to-be-corrected mapping relationship is corrected based on the reference RSSI value and the corresponding distance to obtain a corrected mapping relationship, the corrected mapping relationship may be determined as the target mapping relationship matching the device model of the mobile terminal and stored in the local memory of the on-board terminal.

For example, if no target mapping relationship matching the device model of the mobile terminal is previously stored in the local memory of the on-board terminal, the corrected mapping relationship may be used as the target mapping relationship matching the device model of the mobile terminal and stored in the local memory of the on-board terminal. If a target mapping relationship matching the device model of the mobile terminal is stored previously in the local memory of the on-board terminal, the above corrected mapping relationship may be taken as an updated target mapping relationship to replace the previously-stored target mapping relationship in the local memory of the on-board terminal. Further, when the on-board terminal needs to use the target mapping relationship subsequently, the on-board terminal may obtain it directly from the local memory of the on-board terminal.

Furthermore, as shown in FIG. 2, the method of this embodiment may further include the following step S204.

At step S204, the corrected mapping relationship is uploaded as the target mapping relationship matching the device model of the mobile terminal to the server for storage.

In this embodiment, after the currently-stored to-be-corrected mapping relationship is corrected based on the reference RSSI value and the corresponding distance to obtain a corrected mapping relationship, the corrected mapping relationship may be taken as the target mapping relationship matching the device model of the mobile terminal and uploaded to the server for storage. Thus, other on-board terminals may subsequently download the target mapping relationship from the server.

The corrected mapping relationship may be a general mapping relationship without distinguishing the device model in the related arts, or a target mapping relationship previously stored in the on-board terminal, which is not limited in this embodiment.

For example, the on-board terminal may preferentially send a request for obtaining the target mapping relationship to the server. If the server stores the target mapping relationship, the server may return the target mapping relationship to the on-board terminal based on the request. If the server does not store the target mapping relationship, the server may return a feedback message indicating an absence of the target mapping relationship to the on-board terminal. Thus, the on-board terminal may obtain the target mapping relationship in the above steps S201 to S203.

As can be known from the above descriptions, in this embodiment, a reference RSSI value of the ranging broadcast information sent by the mobile terminal at any one of the at least one reference position is obtained, where a distance between each of the at least one reference position and the vehicle is known. Based on the reference RSSI value and the corresponding distance, the currently-stored to-be-corrected mapping relationship is corrected to obtain a corrected mapping relationship. Further, the corrected mapping relationship is taken as the target mapping relationship matching the device model of the mobile terminal and stored in the local memory of the on-board terminal and/or uploaded to the server. In this way, the target mapping relationship can be directly obtained subsequently, which improves the efficiency of the obtaining the target mapping relationship as well as the accuracy of performing ranging based on the RSSI value. Therefore, the accuracy of performing sensor-less control on the vehicle based on the ranging result can be improved, so as to improve the use experiences of the vehicle users.

FIG. 3 is a flowchart illustrating steps of obtaining the reference RSSI value of the ranging broadcast information sent by the mobile terminal at a reference position according to an exemplary embodiment of the present disclosure. This embodiment illustrates how to obtain the reference RSSI value of the ranging broadcast information sent by the mobile terminal at the reference position on the basis of the above embodiment. As shown in FIG. 3, the step S201 of FIG. 2 for obtaining the reference RSSI value of the ranging broadcast information sent by the mobile terminal at the reference position may include the following steps S301 to S302.

At step S301, a prompt message for sending confirmation information at the reference position is generated.

In this embodiment, when the on-board terminal detects a condition satisfying the correction of the target mapping relationship, a prompt message for prompting the user to send the confirmation information is generated based on the mobile terminal at the reference position. The confirmation information is used to confirm that the mobile terminal is at the reference position.

In some embodiments, detecting the condition satisfying the correction of the target mapping relationship may include at least one of (1) to (3).

(1) An instruction triggered by the user for correcting the target mapping relationship is detected, for example, the user thinks the time that the vehicle unlocks the door lock is not accurate over a period of use of the vehicle, and the user may manually trigger a correction instruction for the target mapping relationship.

(2) A system initialization process of the on-board terminal is detected.

(3) It is detected that the current time reaches a preset period for correcting the target mapping relationship, where the preset period may be set based on actual requirements. For example, the preset period may be set to one month, half a year, or one year, or the like, which is not limited in this embodiment.

In some embodiments, the above reference position may include a preset position around four corners and/or doors of the vehicle, which is not limited in this embodiment.

At step S302, in response to receiving the confirmation information, the reference RSSI value of the ranging broadcast information currently sent by the mobile terminal is obtained.

In this embodiment, when the on-board terminal receives the confirmation information sent by the user based on the mobile terminal, the on-board terminal may determine the mobile terminal is currently at a reference position with a known distance, and further obtain the reference RSSI value of the ranging broadcast information currently sent by the mobile terminal, and also achieve subsequent correction to the currently-stored to-be-corrected mapping relationship based on the reference RSSI value and the corresponding distance. The specific interpretation and descriptions can be referred to in the embodiment shown in FIG. 2 and not described herein.

As can be understood from the above descriptions, in this embodiment, a prompt message for sending confirmation information at the reference position is generated. Additionally, in response to receiving the confirmation information, a reference RSSI value of the ranging broadcast information currently sent by the mobile terminal is obtained. In this way, the user can be directed to send the ranging broadcast information at the at least one reference position, and the reference RSSI value of the ranging broadcast information sent by the mobile terminal at the at least one reference position is obtained. Thus, subsequent correction to the currently-stored to-be-corrected mapping relationship can be achieved so as to obtain the target mapping relationship.

Figure 4:
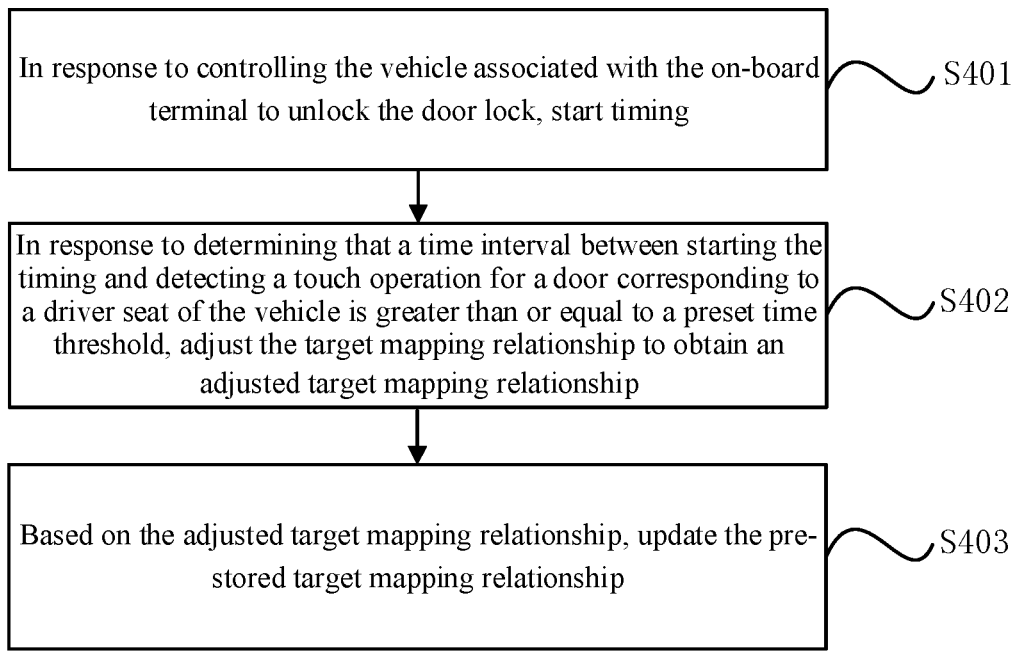
FIG. 4 is a flowchart illustrating steps of updating a pre-stored target mapping relationship according to an exemplary embodiment of the present disclosure.

FIG. 4 is a flowchart illustrating steps of updating the pre-stored target mapping relationship according to an exemplary embodiment of the present disclosure. This embodiment may include the following steps S401 to S403 on the basis of the above embodiment.

At step S401, in response to controlling a vehicle associated with the on-board terminal to unlock the door lock, timing is started.

In this embodiment, when step S103 of FIG. 1, which controls the vehicle associated with the on-board terminal to unlock the door lock, is performed, the timing can be started.

It is to be noted that the manner of starting the timing as above may be selected based on the actual requirements. For example, the timing is started by starting a timer or the like, which is not limited in this embodiment.

At step S402, in response to determining that a time interval between starting the timing and detecting a touch operation for a door corresponding to a driver seat of the vehicle is greater than or equal to a preset time threshold, the target mapping relationship is adjusted to obtain an adjusted target mapping relationship.

In this embodiment, when it is detected that the time interval between starting the timing and detecting the touch operation for the door corresponding to the driver seat of the vehicle is greater than or equal to the preset time threshold, the target mapping relationship can be adjusted.

It is to be noted that the preset time threshold is set based on actual requirements, for example, it may be set to 3 seconds and the like, which is not limited in this embodiment.

It is noted that the above time interval is a length of time it takes the user to walk to the door and open it after the vehicle is controlled to unlock the door lock. It can be understood that if the time length is too long, it indicates that the time for controlling the vehicle to unlock the door lock is too early, leading to a vehicle safety problem. Thus, it is required to adjust the target mapping relationship.

Specifically, in this embodiment, when the target distance corresponding to the target RSSI value is less than or equal to the preset distance threshold, the vehicle associated with the on-board terminal is controlled to unlock the door lock. When the time interval between starting the timing and detecting the operation of touching the door corresponding to a driver seat of the vehicle is greater than or equal to the preset time threshold, it indicates that the actual distance corresponding to the target RSSI value should be greater than the above target distance. Thus, the target mapping relationship is adjusted based on a preset adjustment manner. For example, the distance value corresponding to each RSSI value is increased, with the specific adjustment amplitude determined based on experiences or tests, which is not limited to this embodiment.

At step S403, based on the adjusted target mapping relationship, the pre-stored target mapping relationship is updated.

In this embodiment, after the target mapping relationship is adjusted, the pre-stored target mapping relationship may be updated based on the adjusted target mapping relationship. For example, based on the adjusted target mapping relationship, the target mapping relationship previously stored in the local memory of the on-board terminal or in the server can be replaced for later use.

As can be known from the above descriptions, in this embodiment, in response to controlling the vehicle associated with the on-board terminal to unlock the door lock, the timing is started, and in response to that the time interval between starting the timing and detecting the operation of touching the door of the driver seat of the vehicle is greater than or equal to the preset time threshold, the target mapping relationship is adjusted. Further, based on the adjusted target mapping relationship, the pre-stored target mapping relationship is updated. In this case, based on the actual use of the target mapping relationship, the target mapping relationship is adjusted, so as to further improve the accuracy of the target mapping relationship, and further increase the accuracy of performing ranging based on the target mapping relationship.

Figure 5:
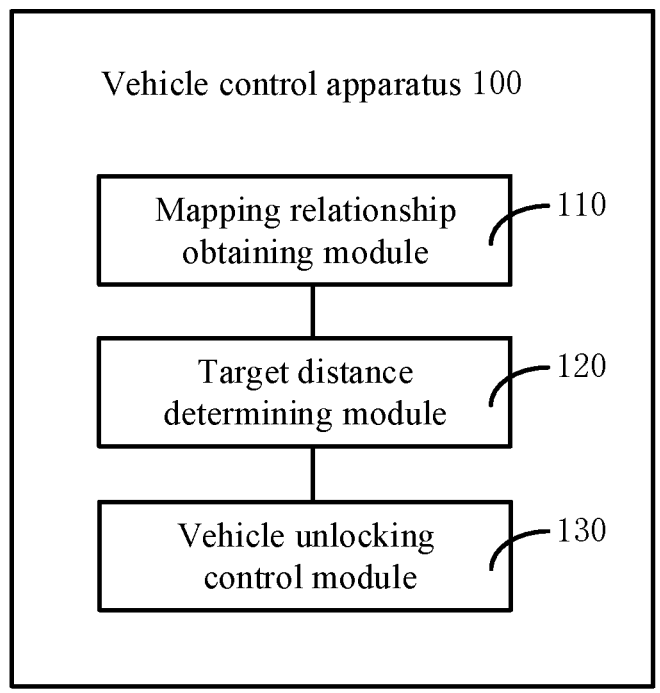
FIG. 5 is a block diagram illustrating a vehicle control apparatus according to an exemplary embodiment of the present disclosure.

FIG. 5 is a block diagram illustrating a vehicle control apparatus 100 according to an exemplary embodiment of the present disclosure. The apparatus 100 of this embodiment may be applied to an on-board terminal (the on-board terminal is associated with a vehicle to perform data processing). As shown in FIG. 5, the apparatus 100 includes: a mapping relationship obtaining module 110, a target distance determining module 120, and a vehicle unlocking control module 130.

The mapping relationship obtaining module 110 is configured to, in response to obtaining a target RSSI value of ranging broadcast information sent by a mobile terminal, obtain a target mapping relationship matching a device model of the mobile terminal. Where the target mapping relationship includes a mapping relationship between a RSSI value and a distance between the mobile terminal and a vehicle.

The target distance determining module 120 is configured to determine a target distance corresponding to the target RSSI value based on the target mapping relationship.

The vehicle unlocking control module 130 is configured to, in response to determining that the target distance is less than or equal to a preset distance threshold, control the vehicle associated with the on-board terminal to unlock a door lock.

As can be known from the above descriptions, in this embodiment, in response to obtaining the target RSSI value of the ranging broadcast information sent by the mobile terminal, a target mapping relationship matching the device model of the mobile terminal is obtained and based on the target mapping relationship, a target distance corresponding to the target RSSI value is determined, and further, in response to that the target distance is less than or equal to the preset distance threshold, the vehicle associated with the on-board terminal is controlled to unlock the door lock. Since the target distance is determined based on the target mapping relationship matching the device model of the mobile terminal, compared with the manner of determining the distance based on the general mapping relationship in the prior arts, the ranging accuracy can be improved. Thus, the accuracy of performing sensor-less control on the vehicle based on the ranging result can be improved, thereby the use experiences of the vehicle users can be improved.

Figure 6:
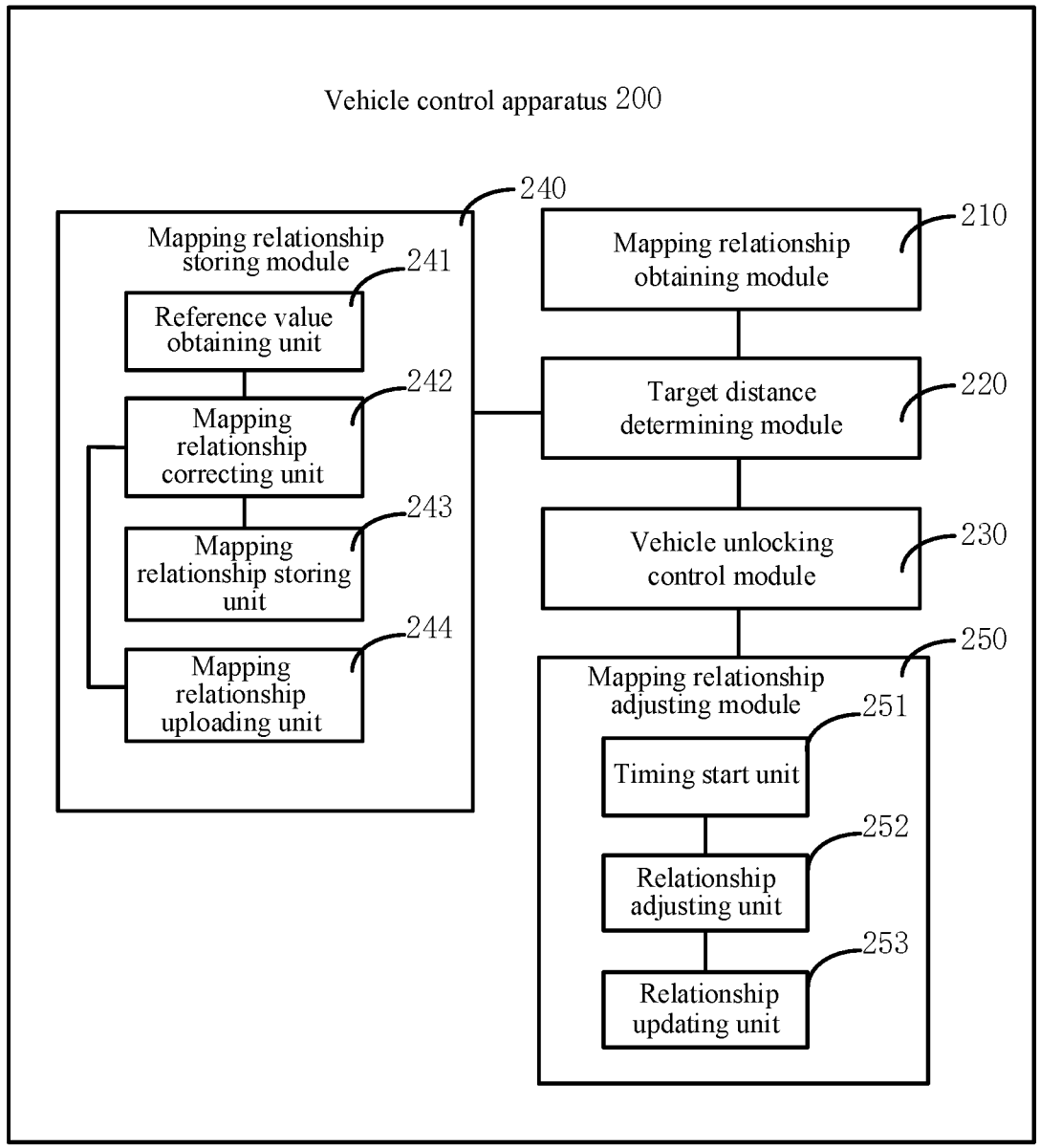
FIG. 6 is a block diagram illustrating a vehicle control apparatus according to another exemplary embodiment of the present disclosure.

FIG. 6 is a block diagram illustrating another vehicle control apparatus 200 according to an exemplary embodiment of the present disclosure. The apparatus 200 of this embodiment may be applied to an on-board terminal (the on-board terminal is associated with a vehicle to perform data processing). A mapping relationship obtaining module 210, a target distance determining module 220 and a vehicle unlocking control module 230 in this embodiment have the same functions as the mapping relationship obtaining module 110, the target distance determining module 120 and the vehicle unlocking control module 130 in the embodiment shown in FIG. 5 and will not be repeated herein.

In this embodiment, the mapping relationship obtaining module 210 may be further configured to obtain a pre-stored target mapping relationship from a server or a local memory of the on-board terminal.

As shown in FIG. 6, the apparatus 200 may further include a mapping relationship storing module 240. The mapping relationship storing module 240 may include a reference value obtaining unit 241, a mapping relationship correcting unit 242, and a mapping relationship storing unit 243.

The reference value obtaining unit 241 is configured to obtain a reference RSSI value of the ranging broadcast information sent by the mobile terminal at a reference position. Where the reference position is any one of at least one reference position, and a distance between each of the at least one reference position and the vehicle is known.

The mapping relationship correcting unit 242 is configured to, based on the reference RSSI value and a corresponding distance between the reference position and the vehicle, correct a currently-stored to-be-corrected mapping relationship to obtain a corrected mapping relationship.

The mapping relationship storing unit 243 is configured to determine the corrected mapping relationship as the target mapping relationship matching the device model of the mobile terminal and store the target mapping relationship in the local memory of the on-board terminal.

In some embodiments, the at least one reference position may include a preset position around a door of the vehicle.

Further, the reference value obtaining unit 241 may be further configured to, in response to detecting a touch operation for the door, obtain the reference RSSI value of the ranging broadcast information currently sent by the mobile terminal.

In some other embodiments, the reference value obtaining unit 241 is further configured to: generate a prompt message for sending confirmation information at the reference position, where the confirmation information is used to confirm that the mobile terminal is at the reference position; and in response to receiving the confirmation information, obtain the reference RSSI value of the ranging broadcast information currently sent by the mobile terminal.

In some embodiments, the above mapping relationship storing module 240 may further include a mapping relationship uploading unit 244. The mapping relationship uploading unit 244 is configured to take the corrected mapping relationship as the target mapping relationship matching the device model of the mobile terminal and upload the target mapping relationship to the server for storage.

In some embodiments, the apparatus 200 may further include a mapping relationship adjusting module 250. The mapping relationship adjusting module 250 may include a timing start unit 251, relationship adjusting unit 252, and a relationship updating unit 253.

The timing start unit 251 is configured to, in response to controlling the vehicle associated with the on-board terminal to unlock the door lock, start timing.

The relationship adjusting unit 252 is configured to, in response to determining that a time interval between starting the timing and detecting a touch operation for a door corresponding to a driver seat of the vehicle is greater than or equal to a preset time threshold, adjust the target mapping relationship to obtain an adjusted target mapping relationship.

The relationship updating unit 253 is configured to update the pre-stored target mapping relationship based on the adjusted target mapping relationship.

The specific manner in which each module in the apparatus 200 in the above embodiments performs operations has already been detailed in the method embodiments and will not be repeated herein.

At least the mapping relationship storing module 240, the mapping relationship obtaining module 210, the target distance determining module 220, the vehicle unlocking control module 230, and the mapping relationship adjusting module 250 are communicatively or physically connected to one another.

Figure 7:
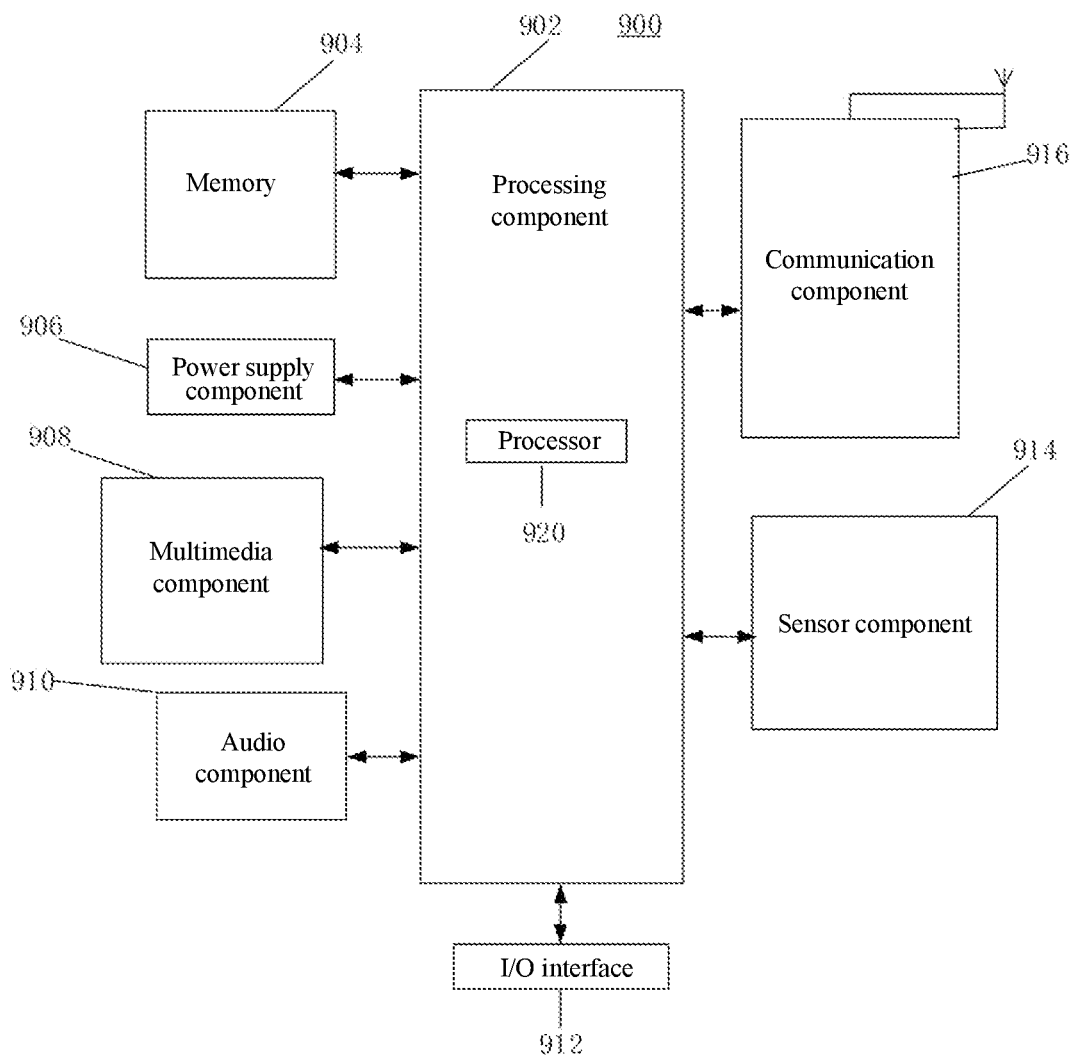
FIG. 7 is a block diagram illustrating an on-board terminal according to an exemplary embodiment of the present disclosure.

FIG. 7 is a block diagram of an on-board terminal 900 according to an exemplary embodiment of the present disclosure. For example, the terminal 900 may be a mobile phone, a computer, a digital broadcast terminal, a message transceiver, a game console, a tablet device, a medical device, a fitness device, a personal digital assistant, and the like.

As shown in FIG. 7, the terminal 900 may include one or more of the following components: a processing component 902, a memory 904, a power supply component 906, a multimedia component 908, an audio component 910, an input/output (I/O) interface 912, a sensor component 914, and a communication component 916.

The processing component 902 generally controls overall operations of the terminal 900, such as operations associated with display, phone calls, data communications, camera operations, and recording operations. The processing component 902 may include one or more processors 920 to execute instructions to complete all or part of the steps of the above methods. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the terminal 900. Examples of such data include instructions for any application or method operated on the terminal 900, contact data, phonebook data, messages, pictures, videos, and so on. The memory 904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 906 supplies power for different components of the terminal 900. The power supply component 906 may include a power supply management system, one or more power supplies, and other components associated with generating, managing, and distributing power for the terminal 900.

The multimedia component 908 includes a screen that provides an output interface between the terminal 900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 908 includes a front camera and/or a rear camera. When the terminal 900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 910 is configured to output and/or input audio signals. For example, the audio component 910 includes a microphone (MIC) configured to receive an external audio signal when the terminal 900 is in an operation mode, such as a call mode, a recording mode, and a voice recognition mode. The received audio signal may be further stored in the memory 904 or transmitted via the communication component 916. In some examples, the audio component 910 also includes a loudspeaker for outputting an audio signal.

The I/O interface 912 provides an interface between the processing component 902 and a peripheral interface module, which may be a keyboard, a click wheel, a button, or the like. These buttons may include, but are not limited to, a home button, a volume button, a start button, and a lock button.

The sensor component 914 includes one or more sensors for providing a status assessment in various aspects to the terminal 900. For example, the sensor component 914 may detect an open/closed state of the terminal 900, and the relative positioning of components, for example, the component is a display and a keypad of the terminal 900. The sensor component 914 may also detect a change in position of the terminal 900 or a component of the terminal 900, the presence or absence of a user in contact with the terminal 900, the orientation or acceleration/deceleration of the terminal 900 and a change in temperature of the terminal 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an acceleration sensor, a gyro sensor, a magnetic sensor, a pressure sensor, or a temperature sensor.

The communication component 916 is configured to facilitate wired or wireless communication between the terminal 900 and other devices. The terminal 900 may access a wireless network based on a communication standard, such as WiFi, 2G or 3G, or 4G or 5G or a combination thereof. In an example, the communication component 916 receives broadcast signals or broadcast associated information from an external broadcast management system via a broadcast channel. In an example, the communication component 916 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the terminal 900 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an example, there is also provided a non-transitory computer readable storage medium, such as a memory 904 including instructions, where the instructions are executable by the processor 920 of the terminal 900 to perform the method as described above. For example, the non-transitory computer readable storage medium may be a Read Only Memory (ROM), a Random Access Memory (RAM), a CD-ROM, a magnetic tape, a floppy disk, an optical data storage device, or the like.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A vehicle control method, performed by an on-board terminal and comprising:
   in response to obtaining a target received signal strength indication (RSSI) value of ranging broadcast information sent by a mobile terminal, obtaining a target mapping relationship matching a device model of the mobile terminal, wherein the target mapping relationship comprises a mapping relationship between a RSSI value and a distance between the mobile terminal and a vehicle;
   based on the target mapping relationship, determining a target distance corresponding to the target RSSI value;
   in response to determining that the target distance is less than or equal to a preset distance threshold, controlling the vehicle associated with the on-board terminal to unlock a door lock; and
   storing the target mapping relationship in advance in a local memory of the on-board terminal by:
      obtaining a reference RSSI value of the ranging broadcast information sent by the mobile terminal at a reference position, wherein the reference position is any one of at least one reference position, and a distance between each of the at least one reference position and the vehicle is known;

based on the reference RSSI value and a corresponding distance between the reference position and the vehicle, correcting a currently-stored to-be-corrected mapping relationship to obtain a corrected mapping relationship; and determining the corrected mapping relationship as the target mapping relationship matching the device model of the mobile terminal, and storing the target mapping relationship in the local memory of the on-board terminal.

2. The method of claim 1, wherein the at least one reference position comprises a preset position around a door of the vehicle, and in response to detecting a touch operation for the door, obtaining a reference RSSI value currently sent by the mobile terminal as the reference RSSI value.

3. The method of claim 1, wherein obtaining the reference RSSI value comprises:

in response to the on-board terminal detecting a touch operation of a user for a door of the vehicle, determining that the mobile terminal is at the reference position, wherein the reference position comprises preset positions around the door;

generating a prompt message for sending confirmation information at the reference position, wherein the confirmation information is configured to confirm that the mobile terminal is at the reference position; and in response to receiving the confirmation information, obtaining a reference RSSI value currently sent by the mobile terminal as the reference RSSI value.

4. The method of claim 1, wherein based on the reference RSSI value and the corresponding distance between the reference position and the vehicle, correcting the currently-stored to-be-corrected mapping relationship to obtain the corrected mapping relationship comprises:

replacing a distance corresponding to a RSSI value corresponding to a reference RSSI value in the currently-stored to-be-corrected mapping relationship with the corresponding distance corresponding to the reference RSSI value; and based on a known signal attenuation law or a preset interpolation algorithm, correcting distances corresponding to other RSSI values in the currently-stored to-be-corrected mapping relationship in a unified way.

5. The method of claim 1, further comprising:

uploading the corrected mapping relationship as the target mapping relationship matching the device model of the mobile terminal to a server for storage.

6. The method of claim 1, wherein obtaining the target mapping relationship comprises:

obtaining a pre-stored target mapping relationship from at least one of a server or the local memory of the on-board terminal.

7. The method of claim 6, further comprising:

starting timing in response to controlling the vehicle associated with the on-board terminal to unlock the door lock;

in response to determining that a time interval between starting the timing and detecting a touch operation for a door corresponding to a driver seat of the vehicle is greater than or equal to a preset time threshold, adjusting the target mapping relationship to obtain an adjusted target mapping relationship; and based on the adjusted target mapping relationship, updating the pre-stored target mapping relationship.

8. An on-board terminal, comprising:

a processor; and a memory communicatively coupled to the processor and configured to store at least one computer program, wherein the processor is configured to, when executing the at least one computer program, perform operations comprising:

in response to obtaining a target received signal strength indication (RSSI) value of ranging broadcast information sent by a mobile terminal, obtaining a target mapping relationship matching a device model of the mobile terminal, wherein the target mapping relationship comprises a mapping relationship between a RSSI value and a distance between the mobile terminal and a vehicle;

based on the target mapping relationship, determining a target distance corresponding to the target RSSI value;

in response to determining that the target distance is less than or equal to a preset distance threshold, controlling the vehicle associated with the on-board terminal to unlock a door lock; and storing, in the memory, the target mapping relationship in advance by:

obtaining a reference RSSI value of the ranging broadcast information sent by the mobile terminal at a reference position, wherein the reference position is any one of at least one reference position, and a distance between each of the at least one reference position and the vehicle is known, based on the reference RSSI value and a corresponding distance between the reference position and the vehicle, correcting a currently-stored to-be-corrected mapping relationship to obtain a corrected mapping relationship, and determining the corrected mapping relationship as the target mapping relationship matching the device model of the mobile terminal, and storing the target mapping relationship in the memory.

9. The on-board terminal of claim 8, wherein the at least one reference position comprises a preset position around a door of the vehicle, and in response to detecting a touch operation for the door, obtaining a reference RSSI value currently sent by the mobile terminal as the reference RSSI value.

10. The on-board terminal of claim 8, wherein obtaining the reference RSSI value comprises:

in response to the on-board terminal detecting a touch operation of a user for a door of the vehicle, determining that the mobile terminal is at the reference position, wherein the reference position comprises preset positions around the door;

generating a prompt message for sending confirmation information at the reference position, wherein the confirmation information is configured to confirm that the mobile terminal is at the reference position; and in response to receiving the confirmation information, obtaining a reference RSSI value currently sent by the mobile terminal as the reference RSSI value.

11. The on-board terminal of claim 8, wherein based on the reference RSSI value and the corresponding distance between the reference position and the vehicle, correcting the currently-stored to-be-corrected mapping relationship to obtain the corrected mapping relationship comprises:

replacing a distance corresponding to a RSSI value corresponding to a reference RSSI value in the currently-stored to-be-corrected mapping relationship with the corresponding distance corresponding to the reference RSSI value; and based on a known signal attenuation law or a preset interpolation algorithm, correcting distances corresponding to other RSSI values in the currently-stored to-be-corrected mapping relationship in a unified way.

12. The on-board terminal of claim 8, the operations further comprise:

uploading the corrected mapping relationship as the target mapping relationship matching the device model of the mobile terminal to a server for storage.

13. The on-board terminal of claim 8, wherein obtaining the target mapping relationship comprises:

obtaining a pre-stored target mapping relationship from at least one of a server or the memory of the on-board terminal.

14. The on-board terminal of claim 13, the operations further comprise:

starting timing in response to controlling the vehicle associated with the on-board terminal to unlock the door lock;

in response to determining that a time interval between starting the timing and detecting a touch operation for a door corresponding to a driver seat of the vehicle is greater than or equal to a preset time threshold, adjusting the target mapping relationship to obtain an adjusted target mapping relationship; and based on the adjusted target mapping relationship, updating the pre-stored target mapping relationship.

15. A non-transitory computer readable storage medium, storing at least one computer program, wherein the at least one computer program, when executed by a processor, causes the processor to perform operations comprising:

in response to obtaining a target received signal strength indication (RSSI) value of ranging broadcast information sent by a mobile terminal, obtaining a target mapping relationship matching a device model of the mobile terminal, wherein the target mapping relationship comprises a mapping relationship between a RSSI value and a distance between the mobile terminal and a vehicle;

based on the target mapping relationship, determining a target distance corresponding to the target RSSI value;

in response to determining that the target distance is less than or equal to a preset distance threshold, controlling the vehicle associated with an on-board terminal to unlock a door lock; and storing the target mapping relationship in advance in a local memory of the on-board terminal by:

obtaining a reference RSSI value of the ranging broadcast information sent by the mobile terminal at a reference position, wherein the reference position is any one of at least one reference position, and a distance between each of the at least one reference position and the vehicle is known, based on the reference RSSI value and a corresponding distance between the reference position and the vehicle, correcting a currently-stored to-be-corrected mapping relationship to obtain a corrected mapping relationship, and determining the corrected mapping relationship as the target mapping relationship matching the device model of the mobile terminal, and storing the target mapping relationship in the local memory of the on-board terminal.

* * * * *